United States Patent [19]

Christian et al.

[11] Patent Number: 5,364,603

[45] Date of Patent: Nov. 15, 1994

[54] MERCURY-FREE DISSOLUTION OF ALUMINUM-CLAD FUEL IN NITRIC ACID

[75] Inventors: Jerry D. Christian, Idaho Falls; Philip A. Anderson, Pocatello, both of Id.

[73] Assignee: The United States of America as represented by the United States Department of Energy, Washington, D.C.

[21] Appl. No.: 105,236

[22] Filed: Aug. 12, 1993

[51] Int. Cl.$^5$ ............................................. C01G 56/00
[52] U.S. Cl. ................................... 423/104; 423/131; 423/132
[58] Field of Search ................... 423/4, 8, 9, 131, 132; 252/626

[56] References Cited

U.S. PATENT DOCUMENTS

H715    12/1989  Greenhalgh ...................... 423/132
4,732,606  3/1988  Köbele et al. ...................... 423/131
4,954,168  9/1990  Crnojevich et al. ................ 423/132
5,078,842  1/1992  Wood et al. ....................... 252/626

Primary Examiner—Donald P. Walsh
Assistant Examiner—Frederick H. Voss
Attorney, Agent, or Firm—James W. Weinberger; Hugh W. Glenn; William R. Moser

[57] ABSTRACT

A mercury-free dissolution process for aluminum involves placing the aluminum in a dissolver vessel in contact with nitric acid-fluoboric acid mixture at an elevated temperature. By maintaining a continuous flow of the acid mixture through the dissolver vessel, an effluent containing aluminum nitrate, nitric acid, fluoboric acid and other dissolved components are removed.

12 Claims, 5 Drawing Sheets

MERCURY-FREE DISSOLUTION OF ALUMINUM-CLAD FUEL IN NITRIC AACID

CONTRACTUAL ORIGIN OF THE INVENTION

The United States Government has rights in this invention pursuant to Contract No. DE-AC07-84ID12435 between the United States Department of Energy and Westinghouse Electric Corporation.

BACKGROUND OF THE INVENTION

Historically, at the Idaho National Engineering Laboratory (INEL), specifically, the Idaho Chemical Processing Plant (ICPP), aluminum-clad nuclear fuels have been dissolved in dilute (4 to 7 M) nitric acid ($HNO_3$) containing 0.001 to 0.01M mercury. Some mercury, as mercuric nitrate $Hg(NO_3)_2$, is reduced on the surface of the aluminum alloy, forming a Hg-Al amalgam that enables rapid dissolution of the protective oxide film and metal substrate in nitric acid. The net reaction for a system in which nitrogen oxides are recovered and recycled is, as in Equation (1), approximately:

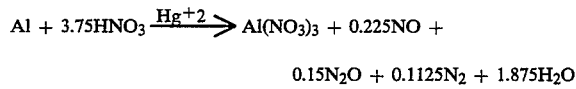

$$0.15N_2O + 0.1125N_2 + 1.875H_2O$$

Mercury catalyzed aluminum fuel dissolution is rapid, efficient, and highly exothermic. Fuel dissolution rates are limited primarily by the ability to remove excess heat and to control foam. Unfortunately, however, mercury is an EPA listed Resource Conservation Recovery Act (RCRA) hazardous waste and its presence in the resulting high-level waste is sufficient to render it into "mixed hazardous waste".

Some development work has been done to explore the feasibility of an electronic aluminum dissolution flowsheet, i.e., to use a flow of electrons through the nitric acid dissolvent via an induced current with a voltage exceeding the ionization potential of the fuel components to enhance dissolution. Although this concept appears to be feasible, its development and the installation and operation of a new facility would be expensive. Hence, the desirability of a flowsheet (process flow) chemically similar to the one historically used at ICPP and using existing ICPP facilities, but with a non-toxic substitute for mercury, is obvious.

BACKGROUND OF TESTS AND RESULTS

A series of scoping tests was conducted to identify a mercury-free dissolution scheme that would yield a dissolver product and waste that are compatible with existing facilities and processes.

Initial scoping tests with ultrasonic enhancement determined little if any increased dissolution of an Al-6061 alloy in 6.8M $HNO_3$. Neither at boiling temperatures nor at room temperature (where ultrasonic cavitation can be more energetic) did an ultrasonic "beam" of approximately 60 watts of 20 kHz focused on the aluminum alloy at a distance of 10 cm yield any discernable effect on the dissolution rate.

The addition of sulfuric acid ($H_2SO_4$) to 6.8M $HNO_3$ at levels ranging from 0.1M to 6.0M $H_2SO_4$ was tested at boiling water bath temperatures. At all levels tested, the presence of $H_2SO_4$ enhanced the dissolution rate. Based on visual observation of the bubbles from the surface of the aluminum, dissolution rates were greater in higher levels of $H_2SO_4$. However, the enhancements were too small to be useful for plant application at levels below 0.5M $H_2SO_4$. In addition, the precipitation of $Al_2(SO_4)_3$ is a problem at higher concentrations of $H_2SO_4$, starting between 1 and 2M $H_2SO_4$.

Several metals or their salts, including cadmium nitrate, ruthenium, osmium, and gallium were tested as catalysts. Gallium, which dissolves in nitric acid, was selected for testing because it has a very low melting point and, therefore, was postulated to possibly behave like mercury. However, none of the metals tested have the ability to amalgamate aluminum as does mercury, so none exhibited any positive effect on aluminum dissolution rates.

A series of tests with 6.8M $HNO_3$ containing up to 1.0M hydrofluoric acid (HF) showed that the addition of up to 0.2M HF enhances aluminum dissolution with more additional aluminum dissolved than is stoichiometrically associated with the HF. At 0.5M HF and higher, the additional amount of aluminum dissolved tends to decrease. During the series of tests with HF added to $HNO_3$, one test was performed using fluoboric acid ($HBF_4$) instead of HF to see how it behaved. Immediately, it was visually apparent that $HBF_4$ significantly enhanced the dissolution rate and sustained it longer than did an equimolar amount of HF in the same concentration of $HNO_3$.

SUMMARY OF THE INVENTION

It is the purpose of this invention to provide a continuous optimum process for the dissolution of aluminum, without the use of a mercury catalyst. The invention generally stated is:

a process for dissolution of aluminum comprising:

preparing a mixture of nitric acid and fluoboric acid in a makeup vessel or individual reagents in separate vessels;

placing an aluminum element in a dissolver vessel having an overflow;

transferring a portion of the mixture of nitric acid and fluoboric acid to the dissolver vessel from the makeup vessel;

heating the dissolver vessel and mixture to a boiling temperature and holding that temperature until a desired concentration of dissolved aluminum is achieved;

adding a constant flow influent of the mixture of nitric acid and fluoboric acid to the dissolver vessel; and collecting an effluent from the dissolver vessel overflow, said effluent containing a mixture of aluminum nitrate, nitric acid, fluoboric acid, water, and dissolved fuel components.

The variables in the above process can be temperature, effluent flow rate, and concentration of the acids as will be discussed later.

For corrosion control, it may be necessary to initiate reaction at a decreased $HNO_3$ concentration and to increase it after a sufficient concentration of aluminum nitrate has accrued.

The process may be adapted to batch processing, as well. Again, acid concentrations may be initially relatively small and, then, gradually increased as reaction proceeds until the desired excess of $HNO_3$ above stoichiometric quantity has been added.

Other objects, advantages, and capabilities of the present invention will become more apparent as the description proceeds.

BRIEF DESCRIPTION OF THE DRAWINGS

The invention may be better understood and further advantages and uses thereof may become more readily apparent when considered in view of the following detailed description of the exemplary embodiments, taken with the accompanied drawings, in which.

DETAILED DESCRIPTION OF THE INVENTION

Figure 1:
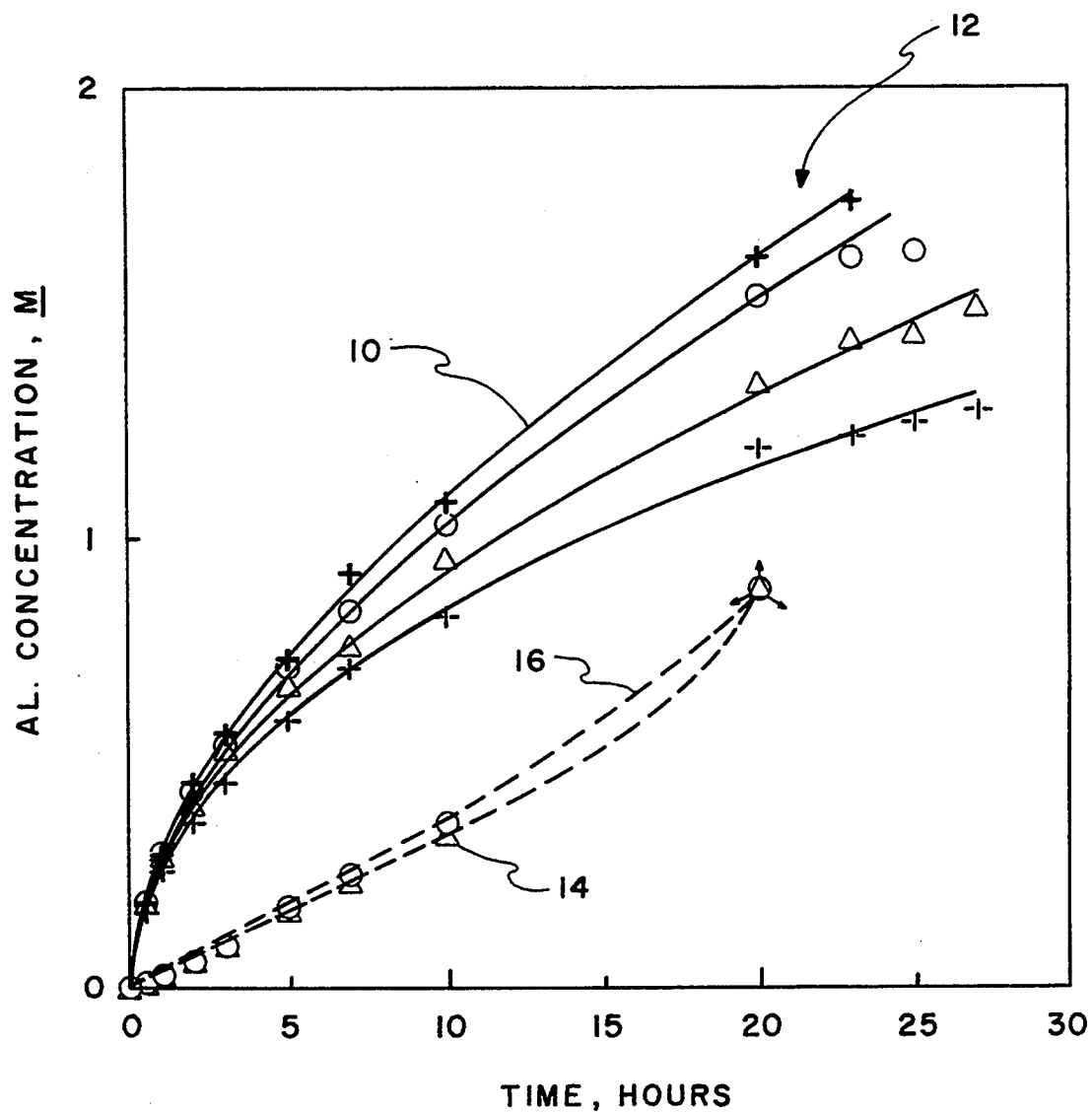
FIG. 1 is a graph of aluminum (molar) concentration versus dissolution time in hours for a batch dissolution process.

A series of batch dissolutions was performed to determine the effects of changing acid concentrations while holding fluoboric acid concentration stable at 0.05M $HBF_4$. They were performed in a boiling water bath with dissolvent temperatures of approximately 91°–92° C. which is 10°–20° C. below the boiling temperature. As shown in FIG. 1, over the range from 4 to 7M $HNO_3$ with constant 0.05M $HBF_4$, the aluminum dissolution rate is greater in higher concentrations of nitric acid indicated at curve 10. This figure illustrates the amounts of aluminum dissolved in different concentrations of nitric acid containing the same initial level of fluoboric acid, i.e., 0.05M. At all four levels tested, the dissolution rate tapers off at the upper end 12 as nitric acid is consumed and as the concentration of dissolved aluminum increases. These batch tests did not determine whether the fluoborate is consumed during the dissolution or significantly affected by the presence of fluoride-complexing aluminum ion or if the reaction slows because $HNO_3$ is consumed. Also shown in FIG. 1, the graph of the dissolution of aluminum alloy in 6 and 7 M $HNO_3$ without $HBF_4$ or Hg catalyst, curves 14 and 16 appear to be slightly concave upward; that is, the dissolution rate increases as nitric acid is consumed. Apparently, as nitric acid is consumed, there is a less strongly oxidizing environment to produce the protective layer of $Al_2O_3$ on the surface of the dissolving aluminum alloy.

Figure 2:
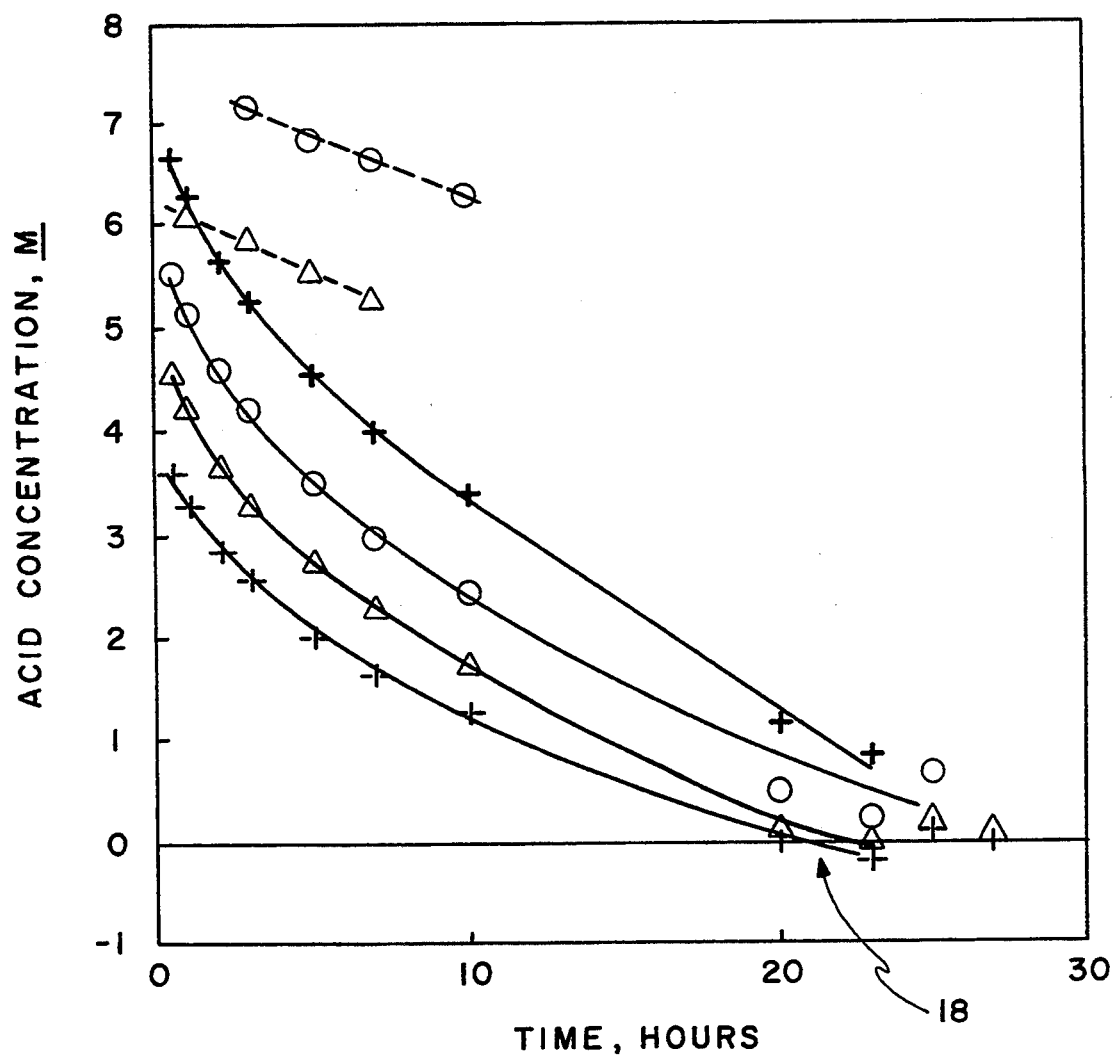
FIG. 2 is a graph of acid concentration versus dissolution time in hours during the process of FIG. 1.

The consumption of nitric acid during the aluminum alloy dissolution described above is shown in FIG. 2. These data correspond to those in FIG. 1, showing that in 4 to 7M $HNO_3$ containing 0.05M $HBF_4$, the consumption of nitric acid is approximately 3.75 moles of $HNO_3$ per mole of aluminum dissolved as predicted by the reaction described in equation (1). Also, catalyzed nitric acid solutions can continue to dissolve aluminum beyond the point where all original nitric acid is consumed, as at 18, yielding an acid deficient product.

Figure 3:
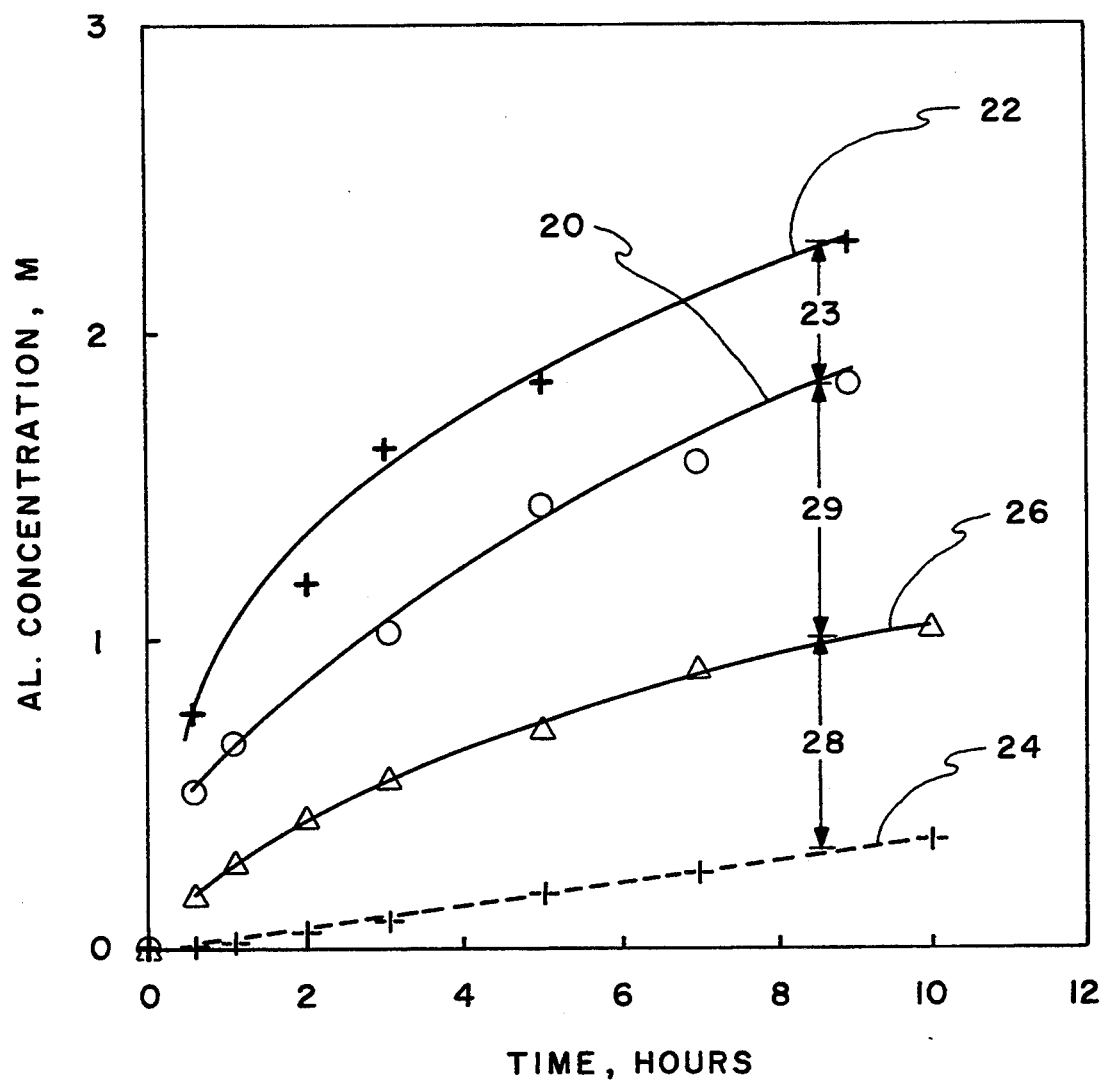
FIG. 3 is a graph of aluminum concentration versus dissolution time in hours for batch dissolution tests.

Another series of tests at 91°–92° C. solution temperatures, shown in FIG. 3, determined the effects of the concentration of $HBF_4$ in a fixed initial concentration of 7.0M $HNO_3$ on aluminum batch dissolution rates. Aluminum dissolution is clearly enhanced at each of the higher levels of $HBF_4$; however, the increase from 0.1 to 0.2M $HBF_4$, curve 20 and 22, did not yield as much net enhancement at 23 as did increasing the $HBF_4$ from 0 to 0.05M, curve 24 and 26, at 28, or from 0.05 to 0.10M at 29. This indicates that only low levels of $HBF_4$ are needed in $HNO_3$ to increase dissolution rates significantly.

Figure 4:
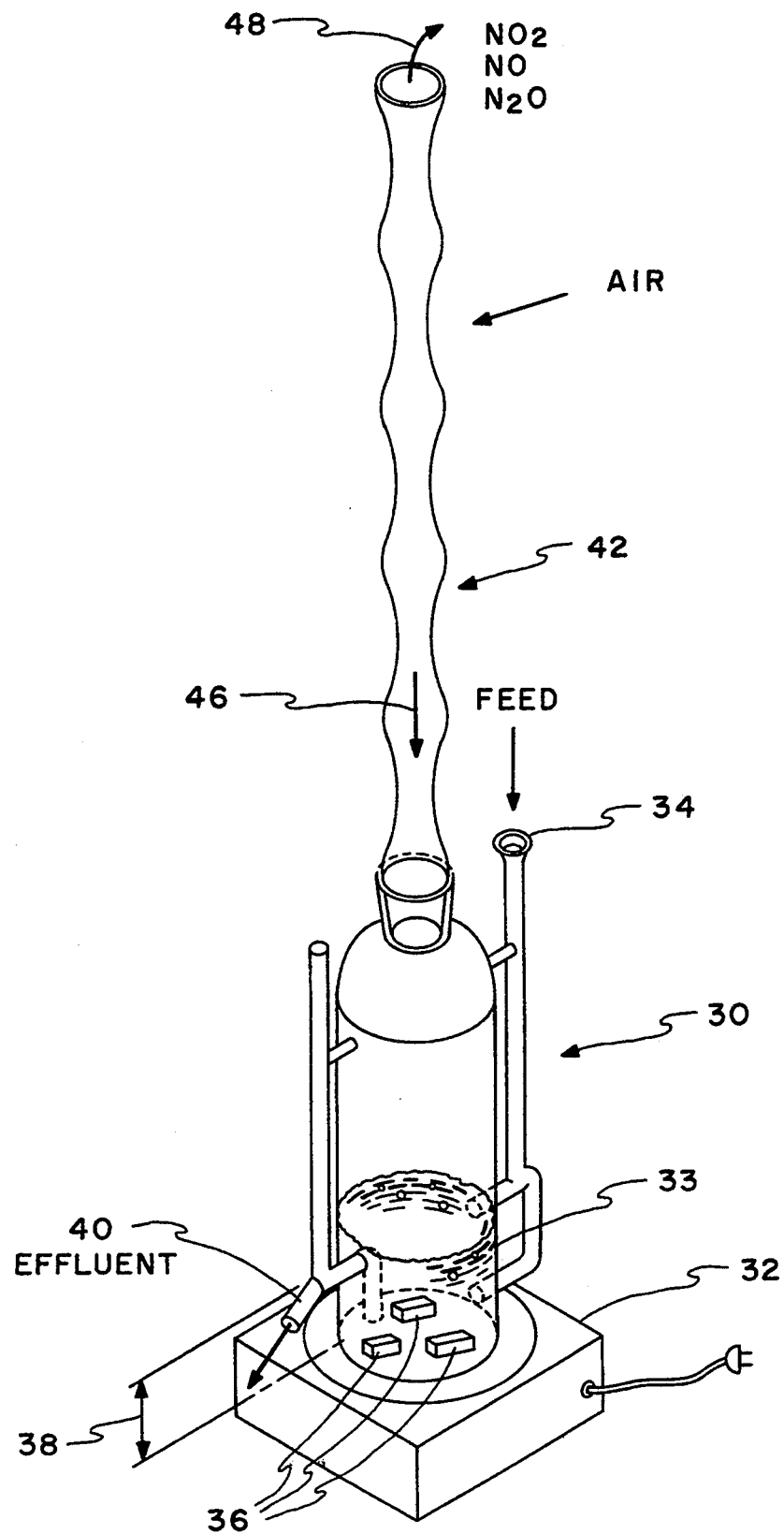
FIG. 4 is a laboratory apparatus for testing a continuous dissolving process.

Additional scoping tests were conducted with a small continuous process dissolver vessel 30 of FIG. 4. A mixture of nitric acid and fluoboric acid was prepared in a makeup vessel. Aluminum alloy 6061 coupons (plates) 36 ranging from 10 to 30 grams (g) with thicknesses of <inch (250 mils) or ⅜ inch (125 mils) were placed in the Pyrex dissolver vessel 30. Dissolvent was pumped in rapidly from the makeup vessel by a peristaltic pump (not shown), to fill the dissolver to the overflow level 38 of approximately 250 mL. The unit was heated to boiling on hot plate 32 and held for an hour or longer to reach the approximate desired steady-state aluminum concentration before beginning each continuous steady addition of dissolvent. The actual steady-state concentration of the dissolver solution for each of the ten tests was controlled by maintaining a constant dissolvent feed addition rate of influent. Influent rates of 3 to 4 mL per minute yielded approximately 0.4 to 0.5M Al effluent solutions, while addition rates of 0.5 mL per minute yielded up to 1.5 M Al product collected at dissolved product effluent conduit 40. For larger volume vessels, the effluent flow rates would be scaled proportionally. The dissolution reaction creates NO, $N_2O$, and $N_2$ gases and evaporated $HNO_3$ and water vapor which pass up through tower 42 where the $HNO_3$ and water vapor are condensed by the air-cooled condenser allowing the condensed $HNO_3$ and water to fall back at 46 to dissolver 30 and pass the gases NO, $N_2O$, and $N_2$ at vent 48. Generally, at least 3 hours of constant, uninterrupted operation were required to attain stable, steady-state conditions for each of these ten tests.

Initial tests with mercury (Hg) catalyzed nitric acid to obtain "baseline" dissolution rates for comparison were unsuccessful. Although Hg-catalyzed dissolution rates in 6.8M $HNO_3$ at 91°–92° C. gave aluminum dissolution rates similar to those of 0.1 or 0.2M $HBF_4$ in 7.0M $HNO_3$ at the same temperature, the results at the boil were drastically different. Somewhere between 95° and 100° C., the Hg-catalyzed dissolution appears to pass a threshold, above which the reaction is rapid, highly exothermic, and generates large amounts of foam that rapidly exceed the capacity of the dissolver test vessel. Further attempts to obtain comparative data for Hg-catalyzed dissolutions were abandoned. The reaction is well known to yield dissolution rates that are immensely faster than required for practical fuel dissolution times.

Figure 5:
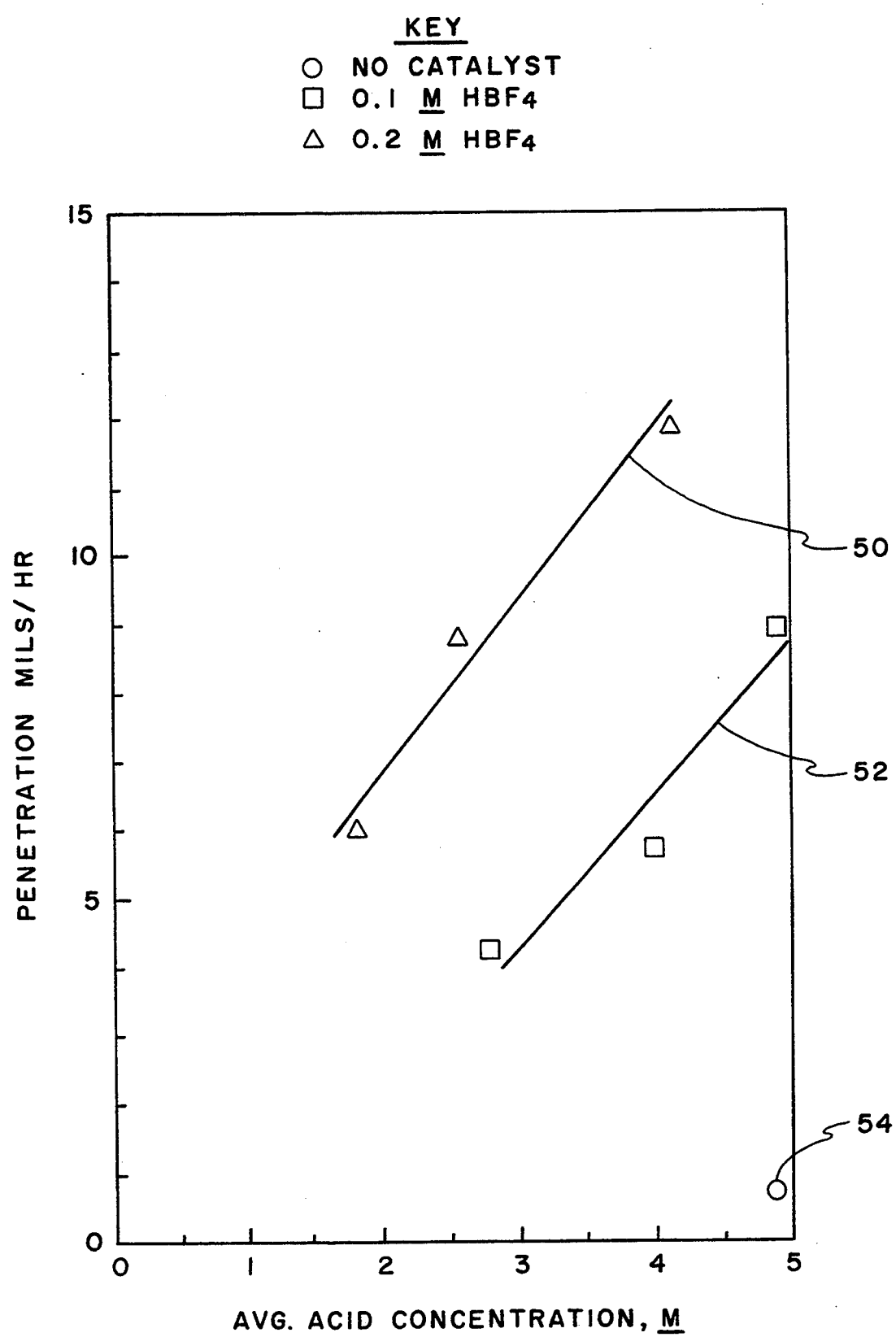
FIG. 5 is a graph of aluminum penetration rate versus the continuous (steady state) process acid concentration.

FIG. 5 is a graph of some of the data (from Table 1) illustrating the effects of increased acid concentrations on the penetration of aluminum coupons at two different concentrations of fluoboric acid $HBF_4$. The higher penetration rate tests using the apparatus as shown in FIG. 4 and indicated at 50, occurs when using the higher $HBF_4$ concentration, i.e., 0.2M $HBF_4$ Both concentrations of $HBF_4$, curve 50 and 52, enhance the process over the no catalyst datum at 54.

The above series of continuous, steady-state tests was conducted with 7.0M $HNO_3$ containing from 0 to 0.20M $HBF_4$ to demonstrate the effectiveness of the dissolvent under steady-state conditions at the boil and to document aluminum alloy penetration rates. The results of this series of ten steady-state tests are presented in Table I.

TABLE I

| Dissolvent | Run Number | Average Al conc. in dissolvent during each test, $\underline{M}$ | Average acid conc. during each test, $\underline{N}^a$ | Temp. °C. | Penetration rate, mils/hr | Time to dissolve 120 mils Al fuel plate, hrs. | Nitric Acid Consumption, moles acid/mole Al dissolved* |
|---|---|---|---|---|---|---|---|
| Al Alloy Penetration Rates with HBF$_4$-Catalyzed 7$\underline{M}$ HNO$_3$ | | | | | | | |
| 7$\underline{M}$ HNO$_3$, no catalyst | I | 0.65 | 4.9 | 108–109 | 0.67 | 89.6 | 3.23 |
| 7$\underline{M}$ HNO$_3$, 0.05$\underline{M}$ HBF$_4$ | II-A | 0.56 | | 108–109 | 4.9 | 12.2 | |
| | II-B | 0.84 | | 108–109 | 7.7 | 7.8 | |
| 7$\underline{M}$ HNO$_3$, 0.10$\underline{M}$ HBF$_4$ | III-A | 0.70 | 4.8 | 109–110 | 8.9 | 6.7 | 3.29 |
| | III-B | 0.92 | 4.0 | 109–110 | 5.8 | 10.3 | 3.37 |
| | III-C | 1.36 | 2.6 | 110–112 | 4.3 | 14.0 | 3.31 |
| 7$\underline{M}$ HNO$_3$, 0.20$\underline{M}$ HBF$_4$ | IV-A | 0.77 | | 107 | 11.5 | 5.2 | |
| | IV-B | 0.99 | 4.1 | 107 | 11.8 | 5.1 | 3.13 |
| | IV-C | 1.16 | 2.6 | 108–109 | 8.9 | 6.7 | 3.97 |
| | IV-D | 1.51 | 1.8 | 109–110 | 6.0 | 9.8 | 3.58 |

*Theoretically 3.75 moles of HNO$_3$ are consumed for each mole of Al dissolved without air sparging. These tests were not sparged. Historically, the ICPP has averaged 3.4 moles of HNO$_3$ consumed per mole of Al dissolved with the Hg-catalyzed flowsheet and sparging with air.

The rates at which aluminum alloy is penetrated were determined over a range of dissolver solution concentrations using 0, 0.05, 0.10, and 0.20M HBF$_4$ in 7.0M HNO$_3$ as the feed dissolvents. The lengths of time required to dissolve a 120-mil-thick aluminum plate were also calculated and recorded in Table 1, since 120 mils is the thickest plate identified in expected aluminum fuel. As shown in Table I and FIG. 5, penetration rates are consistently greater as the HBF$_4$ concentration increased from zero to 0.2M. These data along with the lower temperature batch tests presented in FIG. 3, also indicate the additional enhancing effects of higher levels of HBF$_4$ decreases somewhat between 0.1 and 0.2M; hence, concentrations above 0.2M HBF$_4$ were not tested. The dissolution times for the maximum expected thickness of aluminum fuel are comparable to the one-fuel-charge-per-shift schedule used in past aluminum fuel dissolution campaigns with the mercury-catalyzed flowsheet. This is based on a maximum fuel plate thickness of 120 mils and continuous acid penetration from both sides of the plate.

A possible mechanism, not yet investigated, is that hydrofluoric acid, HF, at small concentrations in equilibrium with HBF$_4$ dissolves the thin aluminum oxide protective film that is continuously formed in nitric acid, allowing the HNO$_3$ to attack the aluminum metal. The aluminum fluoride dissolution product from I-IF reaction with alumina then reacts with relatively high concentrations of nitric acid to partially reform HF. The following reactions summarize this process:

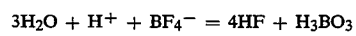

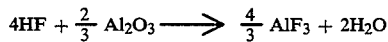

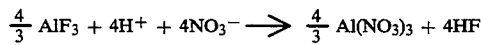

The HF may also react with aluminum metal and be consumed. However, at the small concentration in equilibrium with HBF$_4$, it competes unfavorably with nitric acid in the metal dissolution. The HBF$_4$ may also provide a buffer source of HF for the oxide film dissolution.

Scoping corrosion rate tests were performed with 304L stainless steel and Hastelloy C-4 alloy to estimate the acceptability of these alloys in the existing stainless steel G-cell and Hastelloy C-4 Fluorinel dissolvers, (Fluorinel is a local name for a process for dissolving zirconium-clad nuclear fuels.) The dissolver solution compositions were based on estimates from previous Hg-catalyzed flowsheets instead of the compositions from the tests reported above. Actual HBF$_4$-catalyzed dissolver solutions should have somewhat higher levels of HNO$_3$ than tested here. Higher levels of NO$_3$ would be expected to reduce stainless steel corrosion rates and increase Hastelloy C-4 corrosion rates. As shown in Table II, the unreacted dissolvents, i.e., dissolvents containing no dissolved Al(NO$_3$)$_3$, are unacceptably corrosive to both alloys even at temperatures 5° to 15° C. lower than the boiling temperatures at which they effectively dissolve aluminum alloys. However, it appears that both the Hastelloy C-4 Fluorinel dissolvers in CPP-666 and the stainless steel dissolvers in G-cell could be satisfactory for steady-state operation with dissolvent containing aluminum concentrations of 1M or greater, which is comparable to existing G-cell flowsheets. A corrosion rate of 1–2 mils/month is considered an acceptable rate at ICPP. For batch processes, initiating the reaction with a more diluted catalyst and-/or nitric acid until acid concentration decreased and aluminum concentration increased sufficiently to allow increasing the acid/catalyst concentration(s) is a practical approach to controlling corrosion and achieving adequate dissolution times. Alternatively, the process may be started with a heel of prior dissolver products to which the acids have been added at increased concentrations.

TABLE II

| | Scoping Corrosion Tests with Existing ICPP Dissolver Alloys | | |
|---|---|---|---|
| Alloy | Dissolvent | Temp, °C. | Corrosion rate, mils/month |
| 304 L stainless steel | 6.8$\underline{M}$ HNO$_3$—0.1 HBF$_4$ | 97° | 18.1, 15.4 |
| 304 L stainless steel | 0.8$\underline{M}$ Al(NO$_3$)$_3$—1.8$\underline{M}$ HNO$_3$—0.2$\underline{M}$ HBF$_4$ | 106° (boil) | 1.9 |
| 304 L stainless steel | 1.2$\underline{M}$ Al(NO$_3$)$_3$—1.8$\underline{M}$ HNO$_3$—0.2$\underline{M}$ HBF$_4$ | 106.50° (boil) | 0.5 |
| Hastelloy C-4 | 6.8$\underline{M}$ HNO$_3$—0.1$\underline{M}$ HBF$_4$ | 92° | 18.9, 18.9 |
| Hastelloy C-4 | 0.8$\underline{M}$ Al(NO$_3$)$_3$—3.0$\underline{M}$ HNO$_3$—0.2$\underline{M}$ HBF$_4$ | 106° (boil) | 5.0 |
| Hastelloy C-4 | 1.2$\underline{M}$ Al(NO$_3$)$_3$—1.8$\underline{M}$ HNO$_3$—0.2$\underline{M}$ HBF$_4$ | 106.5° (boil) | 1.8 |

These corrosion tests indicate that dilute nitric acid containing up to 0.2M HBF$_4$ is a viable, mercury-free dissolvent for aluminum alloy fuel reprocessing. The dissolver product would be compatible for flowsheets used with existing uranium extraction and waste processing facilities.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A process for dissolution of aluminum comprising:
   a. preparing a mixture of nitric acid and fluoboric acid in a makeup vessel;
   b. placing an aluminum element in a dissolver vessel having an overflow;
   c. transferring a portion of the mixture of nitric acid and fluoboric acid to the dissolver vessel from the makeup vessel;
   d. heating the dissolver vessel and mixture to a boiling temperature and holding that temperature until a desired concentration of dissolved aluminum is achieved;
   e. adding a constant flow influent of the mixture of nitric acid and fluoboric acid to the dissolver vessel; and
   f. collecting an effluent from the dissolver vessel overflow, said effluent containing a mixture of aluminum nitrate, nitric acid, fluoboric acid, and water.

2. The process as recited in claim 1 wherein the mixture of nitric acid (HNO$_3$) and duoboric acid (HBF$_4$) contains between 4M and 7M HNO$_3$ and between 0.05M and 0.2M HBF$_4$.

3. The process as recited in claim 2 wherein an effluent flow rate is between 0.5 mL per minute and 4 mL per minute and the dissolver vessel capacity is about 250 mL.

4. The process as recited in claim 3 wherein the mixture in the dissolver vessel is heated to a boiling temperature.

5. The process as recited in claim 1 wherein the mixture of nitric acid (HNO$_3$) and fluoboric acid (HBF$_4$) contains about 7M HNO$_3$ and about 0.2M HBF$_4$.

6. The process as recited in claim 2 wherein an effluent flow rate is about 0.5 mL per minute and the dissolver vessel capacity is about 250 mL.

7. A process for dissolution of aluminum comprising:
   a. preparing a mixture of 7M nitric acid and 0.2M fluoboric acid in a makeup vessel;
   b. placing an aluminum element in a dissolver vessel having an overflow;
   c. transferring a portion of the mixture of nitric acid and fluoboric acid to the dissolver vessel from the makeup vessel;
   d. heating the dissolver vessel and mixture to a boiling temperature and holding that temperature until a desired concentration of dissolved aluminum is achieved;
   e. adding a constant flow influent of the mixture of nitric acid and fluoboric acid to the dissolver vessel; and
   f. collecting an effluent from the dissolver vessel overflow, said effluent containing a mixture of aluminum nitrate, nitric acid, fluoboric acid, water, and dissolved aluminum fuel components.

8. The process as recited in claim 7 wherein an effluent flow rate is between 0.5 and 4 mL per minute and the dissolver vessel capacity is about 250 mL.

9. The process as recited in claim 7 wherein an effluent flow rate is about 0.5 mL per minute per 250 mL dissolver vessel volume.

10. The process of claim 7 for dissolution of aluminum comprising:
    a. preparing a mixture of 7M nitric acid and 0.2M fluoboric acid in a makeup vessel having a 250 mL capacity;
    b. placing an aluminum element in a dissolver vessel having an overflow;
    c. transferring a portion of the mixture of nitric acid and fluoboric acid to the dissolver vessel from the makeup vessel;
    d. heating the dissolver vessel and mixture to a boiling temperature and holding that temperature until a desired concentration of dissolved aluminum is achieved;
    e. adding a constant flow influent of the mixture of nitric acid and fluoboric acid to the dissolver vessel at an influent flow rate of about 0.5 mL per minute;
    f. collecting an effluent from the dissolver vessel overflow, said effluent containing a mixture of aluminum nitrate, nitric acid, fluoboric acid, water, and dissolved fuel components.

11. A batch process for dissolution of aluminum comprising:
    a. preparing a mixture of fluoboric acid (HB$_4$) in water with a concentration of nitric acid (HNO$_3$) between 4–7M;
    b. heating the mixture to a boiling temperature; and
    c. placing an aluminum element in the heated mixture, thereby causing the aluminum to be dissolved.

12. The batch process of claim 11 for dissolution of aluminum comprising:
    a. preparing a mixture of between 0.05 and 0.2M fluoboric acid (HB$_4$) in water with a concentration of about 7M nitric acid (HNO$_3$);
    b. heating the mixture to a boiling temperature; and
    c. placing an aluminum element in the heated mixture, thereby causing the aluminum to be dissolved.

* * * * *